United States Patent
Nakasuga et al.

(10) Patent No.: US 9,884,934 B2
(45) Date of Patent: *Feb. 6, 2018

(54) METHOD FOR PRODUCING EXFOLIATED GRAPHITE-POLYMER COMPOSITE MATERIAL

(75) Inventors: Akira Nakasuga, Osaka (JP); Shouji Nozato, Osaka (JP); Takuya Wada, Osaka (JP); Hiroshi Yoshitani, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 294 days.

This patent is subject to a terminal disclaimer.

(21) Appl. No.: 13/978,875

(22) PCT Filed: Jan. 20, 2012

(86) PCT No.: PCT/JP2012/051234
§ 371 (c)(1),
(2), (4) Date: Jul. 9, 2013

(87) PCT Pub. No.: WO2012/105344
PCT Pub. Date: Aug. 9, 2012

(65) Prior Publication Data
US 2013/0296498 A1    Nov. 7, 2013

(30) Foreign Application Priority Data

Feb. 4, 2011    (JP) .................................. 2011-023130

(51) Int. Cl.
| | | |
|---|---|---|
| *C08F 292/00* | (2006.01) | |
| *C01B 31/04* | (2006.01) | |
| *C08F 2/44* | (2006.01) | |
| *C01B 32/20* | (2017.01) | |
| *C01B 32/225* | (2017.01) | |

(52) U.S. Cl.
CPC .......... *C08F 292/00* (2013.01); *C01B 32/20* (2017.08); *C01B 32/225* (2017.08); *C08F 2/44* (2013.01)

(58) Field of Classification Search
CPC .. C08F 292/00; C08F 8/50; C08F 2/44; C01B 32/20; C01B 32/225; C08K 3/04; C08K 2003/045
USPC .............. 524/495, 496, 543, 847; 525/326.1, 525/330.3, 333.3, 333.7
See application file for complete search history.

(56) References Cited

U.S. PATENT DOCUMENTS

| | | | |
|---|---|---|---|
| 4,557,974 A | | 12/1985 | Tsukuda et al. |
| 4,880,577 A | * | 11/1989 | Okita et al. ............ 264/463 |
| 7,658,901 B2 | | 2/2010 | Prud'Homme et al. |
| 9,243,112 B2 | * | 1/2016 | Nakasuga ............ C08G 75/06 |
| 2004/0034151 A1 | * | 2/2004 | Kaschak ............... C08K 3/04 524/495 |
| 2005/0112356 A1 | | 5/2005 | Rynd et al. |
| 2006/0148916 A1 | | 7/2006 | Loh et al. |
| 2008/0287560 A1 | | 11/2008 | Loh et al. |
| 2009/0030090 A1 | | 1/2009 | Krishnamoorti et al. |
| 2010/0096595 A1 | | 4/2010 | Prud'Homme et al. |
| 2011/0064938 A1 | | 3/2011 | Breindel et al. |

FOREIGN PATENT DOCUMENTS

| | | | |
|---|---|---|---|
| CN | 1772805 A | | 5/2006 |
| CN | 1886449 A | | 12/2006 |
| CN | 101558457 A | | 10/2009 |
| JP | 58-69788 A | | 4/1983 |
| JP | 3-41161 | * | 2/1991 |
| JP | 3-41161 A | | 2/1991 |
| JP | 11-70612 A | | 3/1999 |
| JP | 2008-508417 A | | 3/2008 |
| JP | 2010-506013 A | | 2/2010 |
| WO | WO 2010/016976 A1 | * | 2/2010 |

OTHER PUBLICATIONS

English Translation of Written Opinion of the International Searching Authority (PCT/ISA/237) for Application No. PCT/JP2012/051234 dated Aug. 15, 2013.
International Search Report for the Application No. PCT/JP2012/051234 dated Feb. 21, 2012.
Written Opinion of the International Searching Authority (PCT/ISA/237) for Application No. PCT/JP2012/051234 dated Feb. 21, 2012.
Nagata, Kazuhiro et al., "Preparation and dispersibility of polymer-grafter graphene oxide", Polymer Preprints, Japan, 2011, vol. 60, No. 1, p. 170.

* cited by examiner

*Primary Examiner* — Roberto Rabago
(74) *Attorney, Agent, or Firm* — Cheng Law Group, PLLC

(57) ABSTRACT

Provided is a production method which can attain exfoliating treatment of graphite and a process of grafting a polymer onto exfoliated graphite simultaneously and thus makes it possible to easily obtain an exfoliated graphite-polymer composite material in a short time. A method for producing an exfoliated graphite-polymer composite material includes a step of mixing graphite or primary exfoliated graphite, a depolymerizable monomer of which the polymer is decomposed by heating to generate radicals and also to form a monomer or an oligomer, or the polymer A of the monomer, or a polymer B which forms radicals at a temperature close to its decomposition temperature to obtain a mixture; and a heating step of putting the mixture in a non-open container to heat the mixture to a first temperature range from the ceiling temperature or higher to the onset decomposition temperature or lower, or to a temperature higher than the first temperature range.

10 Claims, 7 Drawing Sheets

METHOD FOR PRODUCING EXFOLIATED GRAPHITE-POLYMER COMPOSITE MATERIAL

TECHNICAL FIELD

The present invention relates to a method for producing an exfoliated graphite-polymer composite material obtained by grafting a polymer onto exfoliated graphite, and more particularly to a method for producing a composite material obtained by mixing a depolymerizable monomer, a polymer A of the monomer, a polymer B forming a radical at a temperature close to its decomposition temperature, and graphite, and heating the mixture to thereby graft the polymer onto exfoliated graphite.

BACKGROUND ART

Graphite is a hexagonal layer compound of SP2 carbon and a layer constituting graphite is called graphene. Previously, a method of heat-treating silicon carbide and a method of layering graphene on a metal film such as a copper foil by the CVD method have been known for obtaining graphene.

On the other hand, a method has been known in which graphite is treated with a strong acid to dope ions between graphite layers and is further rapidly heat-treated to obtain graphene oxide or exfoliated graphite which is more reduced in the number of graphene layers than original graphite (Patent Literature 1 described below).

Also previously, various studies have been made as to composite materials of a polymer and exfoliated graphite obtained by a treatment of exfoliating graphite. For example, the following Non-Patent Literature 1 reports that when a polymerization initiator and a styrene monomer component are mixed in the coexistence of exfoliated graphite obtained by a treatment of exfoliating graphite based on chemical treatment to polymerize the monomers, a styrene polymer chain is grafted onto the surface of graphene.

CITATION LIST

Patent Literature

Patent Literature 1: U.S. Pat. No. 7,658,901 B02

Non-Patent Literature

Non-Patent Literature 1: 59th Annual Meeting of The Society of Polymer Science, Preprints, 3Pb016

SUMMARY OF INVENTION

Technical Problem

When an exfoliated graphite-polymer composite material is obtained, the method in which after exfoliated graphite is obtained, a monomer is grafted and further the polymer is graft-polymerized gives rise to the problem that the handling of exfoliated graphite as the raw material is complicated. Specifically, exfoliated graphite and graphene after exfoliating treatment is so light-weight that they float in the air and it is therefore difficult to handle exfoliated graphite after exfoliating treatment. For this reason, there is another way to make exfoliated graphite-polymer. Where exfoliated graphite is redispersed in a solvent, and a polymerization initiator or a copolymerizable monomer with functional group are grafted onto the surface of graphene in the dispersion solution previously. After that, the additional monomer is polymerized in the solution to graft a polymer onto the surface of graphene. Accordingly, it takes a very long time to carry out the process.

Moreover, when exfoliated graphite and the nanocarbon material is redispersed in a dispersion medium or solvent, if the concentration of a nanocarbon material is high, a highly viscous slurry is obtained. Even if, for example, only about 1% by weight of exfoliated graphite is dispersed in a solvent or dispersion medium, a slurry having very high viscosity or a hard coagulated block is produced. For this reason, if the concentration of exfoliated graphite is not made to be extremely lower, it would not be easy to carry out stirring. Therefore, it is difficult to obtain a composite material produced by grafting a polymer onto exfoliated graphite.

It is an object of the present invention to provide a production method which can attain exfoliating treatment of graphite and a process of grafting a polymer onto exfoliated graphite simultaneously and thus makes it possible to easily obtain an exfoliated graphite-polymer composite material in a short time.

Solution to Problem

The present inventors have found that graphite can be exfoliated to be thin and also, a polymer can be grafted onto exfoliated graphite with high efficiency, by making graphite heat-treatment with a depolymerizable monomer, or with a polymer made from the monomer, or with a polymer which has potential forming a radical at a temperature close to the decomposition temperature of the polymer in a non-open container. These findings have now led to completion of the present invention.

The exfoliating to be thin referred to herein means exfoliating into about 1 to 200 graphene layers and dispersing a coagulate of nanoparticles to be primary particles.

A method for producing an exfoliated graphite-polymer composite material according to the present invention is provided with a step of mixing graphite or primary exfoliated graphite, with a depolymerizable monomer of which the polymer is decomposed by heating to generate radicals and also to form a monomer or an oligomer, or the polymer A polymerized of the monomer, or a polymer B which generates radicals at a temperature equal to or higher than its decomposition temperature to obtain a mixture; and a heating step of putting the mixture in a non-open container to heat the mixture to a first temperature range or to a temperature higher than the first temperature range when a temperature range from the ceiling temperature or higher to onset decomposition temperature or lower of the polymer A or B is defined as the first temperature range. The onset decomposition temperature referred to herein means a temperature at which 10% by weight of the above polymer A or B is decomposed when TG/DTA measurement is made in a nitrogen atmosphere. Also, the definition of the ceiling temperature is described in "Radical Polymerization Handbook" p. 112 (published from NTS Inc.).

When the temperature is close to the onset decomposition temperature even in the case where the temperature is lower than the onset decomposition temperature, a polymer is decomposed to generate radicals, as is clear from the above definition. In this specification, the operation for heating the mixture to a first temperature range from the ceiling temperature or higher to the onset decomposition temperature or lower when heating in the above heating step is referred to as an α-operation.

In a certain aspect of the method for producing an exfoliated graphite-polymer composite material according to the present invention, there is further provided another step of heating the mixture in the second temperature range exceeding the onset decomposition temperature and lower than the decomposition-completion temperature, that is defined at which 90% by weight of the above polymer A or B is decomposed. In this case, a step of repeating the heat treatment in the first temperature range and second temperature range may be performed continually, which enables grafting of a polymer onto exfoliated graphite and restriction to the reduction of the molecular weight of the polymer. The step of repeating the heat treatment in the first temperature range and second temperature range is hereinafter referred to as a B-operation. The decomposition-completion temperature referred to herein means a temperature at which 90% by weight of the polymer is decomposed when TG/DTA measurement is made in a nitrogen atmosphere.

In another certain aspect of the method for producing an exfoliated graphite-polymer composite material according to the present invention, there is further provided a step of heating the mixture to a third temperature range higher than the above decomposition-completion temperature in the above heating step.

In still another certain aspect of the method for producing an exfoliated graphite-polymer composite material according to the present invention, a middle-temperature heating step of heating the mixture to the above second temperature range and a high-temperature heating step of heating the mixture to the above third temperature range are repeated. This operation is referred to as a C-operation. When the C-operation is carried out, the progress of the exfoliating of graphite can be made more efficiently. Further, the polymer grafting rate can be more improved.

The technological significance of the above A-operation to C-operation will be briefly described.

The A-operation is an operation of heating the mixture to a temperature range where the generation of radicals caused by heat decomposition gradually occurs. Therefore, the molecular length of the polymer to be grafted can be increased though the grafting rate of the polymer A or B is relatively low.

The B-operation is performed in a temperature range where the heat decomposition of the polymer is caused more actively than in the case of the A-operation. Therefore, the grafting rate can be improved.

The C-operation is performed in a temperature range where heat decomposition is caused more actively than the A-operation and B-operation. Accordingly, the C-operation can progress the exfoliating of graphite and can increase the number and density of grafting starting sites.

In a still another certain aspect of the exfoliated graphite-polymer composite material according to the present invention, the onset decomposition temperature is a temperature at which the equation, $(X-R)/(A_0-R)=0.9$, is satisfied, and the decomposition-completion temperature is a temperature at which the equation, $(Y-R)/(A_0-R)=0.1$, is satisfied, when the minimum weight of a decomposed residue is R which is the weight in the third temperature range higher than the decomposition-completion temperature of the above polymer A or B, and is lower than 1000° C., the maximum weight of the polymer A or B in the first temperature range is $A_0$ (weight excluding the weights of adsorbed water, adsorbed gas, and contained solvents), the weight of the polymer A or B at the onset decomposition temperature is X, and the weight of the polymer A or B at the decomposition-completion temperature is Y. As mentioned above, the onset decomposition temperature and decomposition-completion temperature can be determined by the above each equation whether a decomposed residue is produced or not when the above polymer A or B is heated to the above third temperature range. These onset decomposition temperature and decomposition-completion temperature can be read from TG/DTA measurement in a nitrogen atmosphere.

Also, in a still another certain aspect of the exfoliated graphite-polymer composite material according to the present invention, two or more types of monomers or polymers are used as the above monomer or polymer A or B. In this case, when a polymer obtained using a mixture of two or more types of monomers as a starting material or a mixture of two or more types of polymers which have been already polymerized is used, the onset decomposition temperature and decomposition-completion temperature may be read from a TG/DTA pattern of a mixture of two or more types of monomers or a mixture of two or more types of polymers to carry out graft treatment according to the above operation method.

Also, these two or more monomers or polymers may be sequentially treated. In this case, plurality of polymers can be grafted one after another onto exfoliated graphite. In this case, it is preferred that after graft treatment is carried out using a monomer or polymer having a higher decomposition temperature, another monomer or polymer having a relatively lower decomposition temperature is further added, followed by mixing, to thereby perform graft treatment repeatedly. This method allows different polymers to be grafted onto exfoliated graphite. Therefore, a composite material having various properties such as amphiphilicity can be easily provided.

In a still another certain aspect of the exfoliated graphite-polymer composite material according to the present invention, carbon dioxide or water put into a supercritical state is mixed in the heating step.

In a still another certain aspect of the exfoliated graphite-polymer composite material according to the present invention, the above mixture does not contain a polymerization initiator. According to the present invention, the above monomer or polymer can be grafted onto exfoliated graphite by radicals produced by the spontaneous decomposition of the polymer even if the polymerization initiator is not used.

The exfoliated graphite-polymer composite material according to the present invention is obtained by the method for producing an exfoliated graphite-polymer composite material according to the present invention, and the X-ray diffraction peak intensity of the composite material is 50% or less of the X-ray diffraction peak intensity derived from the untreated graphite layer crystal at 26.4 degree.

The present invention will be described in detail.

(Graphite and Primary Exfoliated Graphite)

In the present invention, graphite or primary exfoliated graphite is used as a raw material. Graphite is a material whose surface has radical trapping characteristics. As mentioned above, graphite is a layer compound in which many graphene layers are stacked. In this specification, the "primary exfoliated graphite" is exfoliated graphite used as a raw material and refers to one reduced in the number of graphene layers than the aforementioned graphite.

The number of graphene layers in this primary exfoliated graphite refers to that of graphene layers having a surface area of 500 m$^2$ or less per gram when the surface area is measured by BET which will be described later.

Also, in this specification, the "exfoliated graphite" in the exfoliated graphite-polymer composite material finally obtained refers to one having about 1 to 200 layers as the number of graphene layers.

In this case, the number of graphene layers in the raw material graphite is usually 1000 or more. Such an average number of layers can be calculated from the surface area measured by BET. If the exfoliated graphite is constituted of perfectly one graphene layer, it is theoretically estimated that this surface area becomes 2400 to 2600 m$^2$ per gram. This surface area per gram is defined as a specific surface area hereinafter.

According to the method described in Patent Literature 1 mentioned above, exfoliated graphite having a specific surface area of about 2000 m$^2$/g can be obtained. In this case, the average number of graphene layers is estimated to be about 1 to 2.

On the other hand, exfoliated graphite having a specific surface area exceeding 500 m$^2$/g floats in the air when it is put into a dry state as mentioned above. Accordingly, this makes difficult to handle the exfoliated graphite. In the case of exfoliated graphite or graphite having a specific surface area of 500 m$^2$/g or less, on the contrary, it is easily weighed and, for example, it is also easily charged into producing equipment.

Therefore, primary exfoliated graphite having a specific surface area of 500 m$^2$/g or less measured by BET may be used as a raw material in the present invention. In the production method of the present invention, the dispersibility of final exfoliated graphite in the composite material can be improved as the specific surface area of the primary exfoliated graphite used as the raw material is increased. However, even if primary exfoliated graphite having a diameter as relatively large as about 10 μm, that is, primary exfoliated graphite having a relatively smaller specific surface is used, the grafting of a polymer and exfoliating into thinner final exfoliated graphite can be accomplished.

(Depolymerizable Monomer or Polymer of the Monomer)

In the production method of the present invention, the aforementioned graphite or primary exfoliated graphite, and a depolymerizable monomer or a polymer A obtained by polymerizing the monomer, or a polymer B forming radicals at a temperature close to the onset decomposition temperature are mixed to obtain a mixture. When this depolymerizable monomer is heated to the above first temperature range in a non-open container, radicals spontaneously generate, leading to the progress of polymerization. Also, gradual depolymerization of the polymer A produced by polymerization proceeds. Examples of the monomer include such as styrene, methylmethacrylate, methyl α-ethylacrylate, methyl α-benzylacrylate, methyl α-[2,2-bis(carbomethoxy)ethyl]acrylate, dibutyl itaconate, dimethylitaconate, dicyclohexyl itaconate, α-methylene-δ-valerolactone, α-methylstyrene, α-acetoxystyrene, and α-substituted acrylates; and the like.

The polymer A obtained by polymerizing the above depolymerizable monomer as the raw material undergoes a decomposition reaction in the first temperature range though only slightly, undergoes a decomposition reaction in the second temperature range to the extent that the average molecular weight of polymer drops, and proceeds with a decomposition reaction in the third temperature range until it is decomposed into low molecules close to a monomer which is a unit of the polymer. In the case of a polymer kept in such a decomposition temperature range in a non-open state, the molecular weight of an obtained polymer does not dramatically drop like that in an open system even when the heating time is relatively lengthened. This is a phenomenon different from that of the decomposition reaction in an open system. Because, viewing from this phenomenon, the molecular weight of a polymer does not rapidly drop even in high decomposition temperature in a non-open system, it is predicted that radical species might be successively produced. The aforementioned non-open state is attained by charging the above mixture into a non-open container and by heating in the same manner as above. Such a non-open container refers to a non-open container to the extent that low-molecular components such as decomposed products do not leak out of the container.

No particular limitation is imposed on the polymer B whether it has possibility forming radicals at a temperature close to the decomposition temperature. Many organic polymers generate radicals at the decomposition temperature. The following various types of polymers may be used as the above polymer B usable in the present invention.

Examples of the polymer B may include polyalkyl(meth)acrylate, polypropylene, polyvinylphenol, polyphenylene sulfide, polyphenylene ether, and the like.

Polymers containing a halogen element such as polyvinyl chloride, chlorinated polyvinyl chloride, an ethylene fluoride resin, a vinylidene fluoride resin, and a vinylidene chloride resin may also be used.

An ethylene/vinyl acetate copolymer (EVA), polyvinyl acetal, polyvinyl pyrrolidone, or their copolymers may also be used.

Polymers such as polyisobutylene and polyalkylene ether which are obtained by cation polymerization may also be used.

Polyurethane, polyepoxy resin, modified silicone, a silicone resin, and the like which are obtained by polymerizing or crosslinking oligomers may also be used.

Moreover, polyallylamine or the like may be used as the polymer B. If polyallylamine or the like is used, an amino group can be grafted onto a carbon material. On the other hand, if polyvinylphenol or polyphenols are used, phenolic OH can be grafted on a carbon material. Also, if a polymer having a phosphoric acid group is used, a phosphoric acid group can be grafted.

Also, when a condensed polymer such as polyester or polyamide is used, a decomposed product is grafted though the concentration of radicals obtained at the decomposition temperature is low.

(First to Third Temperature Ranges)

Figure 1:
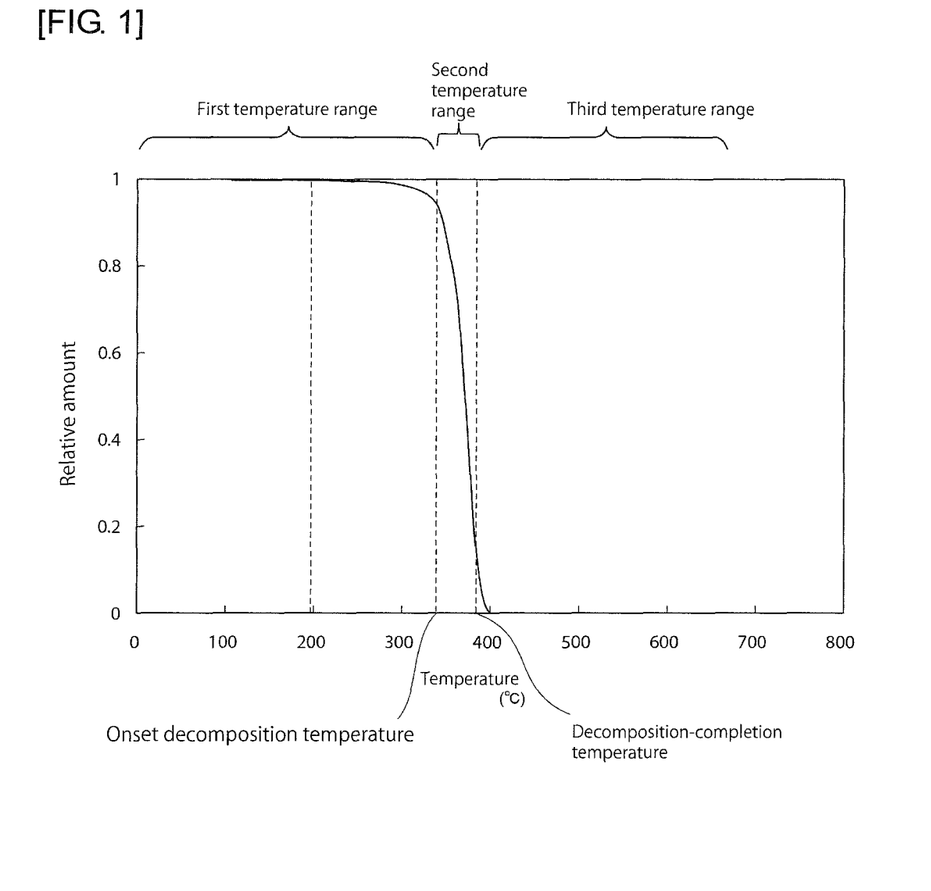
FIG. 1 is a view showing a relation between heating temperature and the relative weight concentration of a polymer when polystyrene is used as a polymer.

The aforementioned first to third temperature ranges will be described with reference to FIG. 1 taking polystyrene as an example. FIG. 1 is a view showing a relation between heating temperature and the relative amount of a polymer when polystyrene is used as the polymer. As shown in FIG. 1, polystyrene is not almost decomposed in the first temperature range. However, if polystyrene is heated at a temperature exceeding the first temperature range, the weight of the polystyrene is dropped, that is, the polymer starts to decompose, generating radicals. Moreover, when the temperature exceeds the second temperature range, the decomposition is completed, so that polystyrene is decomposed mainly into styrene. Also, when polystyrene is gradually cooled to the first temperature range through the second temperature range from the first temperature range, unreacted styrene monomers are polymerized again into polystyrene.

When polystyrene is kept under heating in a non-open container in each temperature range, a reduction in molecular weight occurs at high temperatures like the case of an open system. However, even if the heating time is increased, a reduction rate in molecular weight in a non-open system slower than in an open system.

In the present invention, graphite or primary exfoliated graphite may be mixed with the above monomer to obtain a mixture or the above graphite or primary exfoliated graphite may be mixed with the above polymer-A of the monomer or the above polymer B to obtain a mixture. In the above mixing, an appropriate mixing method such as an ultrasonic dispersing machine, homogenizer or planetary stirring machine may be used. Also, the mixing may be performed under normal pressure until the process reaches the heating step which will be described later, but preferably, the mixing may be performed under pressure enough to prevent the monomer from being vaporized. This ensures that the vaporization of the monomer can be restrained, so that a sufficient amount of polymer can be grafted onto exfoliated graphite.

Carbon dioxide gas and water are preferable as an assist gas used to apply pressure.

Exfoliating and grafting at a lower temperature can be attained by using these gases to raise pressure.

In this case, when the above polymer A or B is used as the raw material, it is desirable to knead the polymer A or B with graphite or primary exfoliated graphite under heating to prepare a mixture. This procedure makes the mixture plasticized and further increases the probability of the contact of graphite or primary exfoliated graphite with radicals generated in the heating step.

The compounding ratio by weight of the above graphite or primary exfoliated graphite to the above monomer is, though not particularly limited to, desirably 50:50 to 0.01:99.9. Also, when the above polymer is used as the raw material, the compounding ratio by weight of the above graphite or primary exfoliated graphite to the above polymer is desirably 50:50 to 0.5:99.5.

As the above monomer or polymer, two or more types may be used to thereby enable the production of a composite material obtained by compositing an alloy of a plurality of polymers with exfoliated graphite. In this case, two or more types of monomers may be used, two or more types of polymers may be used, or one or more types of monomers and one or more types of polymers may be used.

(Heating Step)

When a depolymerizable monomer and graphite are used as the above mixture in the present invention, they are heated in a non-open container in which low-molecular components such as the above monomer are not vaporized. In the heating, as mentioned above, the mixture is heated to a temperature exceeding the first temperature range which is defined as a temperature range from the ceiling temperature or higher of the polymer A or B to a temperature lower than the onset decomposition temperature. In this case, when the mixture is heated to a temperature exceeding the ceiling temperature and close to the onset decomposition temperature, radicals are generated while restraining the vaporization of the monomer, enabling polymerization of the monomer. The radicals formed in the temperature range where this polymerization is primarily caused attack the surface and edges of graphite to exfoliate graphite or primary exfoliated graphite, leading to the progress of exfoliating to be thin.

Moreover, the heat-decomposed radicals generated by decomposition are grafted onto exfoliated graphite at the onset decomposition temperature or higher. In this case, the decomposition of the polymer starts and therefore the molecular weight of the polymer grafted onto exfoliated graphite is also dropped at a temperature higher than the above onset decomposition temperature, that is, in the second temperature range.

Next, the reaction system is cooled. Exfoliated graphite onto which the polymer is grafted can be thereby recovered. In this case, it is preferable to cool the reaction system gradually to the first temperature range. Because unreacted monomers are polymerized again due to this process, the ratio of the polymer which adsorbs to exfoliated graphite can be increased.

When the polymer is heated up to the upper limit of the first temperature range the polymer decomposition is little, but when they are heated to the second temperature range in the case of using the polymer A or B as the raw material, we could see that the polymer starts to decompose. It is considered that as a result, radicals are generated and also, active species of the polymer are grafted onto exfoliated graphite.

After a high-temperature heating step of heating the mixture to the third temperature range higher than the above decomposition-completion temperature is carried out, it is preferable to heat the mixture to the second temperature range as the middle-temperature heating. In this case, a large amount of active radicals is produced from the polymer by heat decomposition and grafted onto graphite in the third temperature range. In the next middle-temperature heating step, unreacted monomers are polymerized and the average chain length of the polymer to be adsorbed can be increased. Alternatively, when the high-temperature heating step and the middle-temperature heating step are repeated, the chain length of the polymer can be more increased and also, the graphite exfoliating treatment can be effectively carried out.

A residue having resistance to heat decomposition may be produced at a temperature higher than the above decomposition-completion temperature depending on the type of polymer. In this case, the onset decomposition temperature and the decomposition-completion temperature may be identified as follows. Specifically, the onset decomposition temperature is a temperature at which the equation, $(X-R)/(A_0-R)=0.9$, is satisfied, and the decomposition-completion temperature is a temperature at which the equation, $(Y-R)/(A_0-R)=0.1$, is satisfied when the weight of the decomposed residue is R, the maximum weight of the polymer in the above first temperature range is $A_0$, the weight of the polymer at the onset decomposition temperature is X, and the weight of the polymer at the decomposition-completion temperature is Y.

Figure 2:
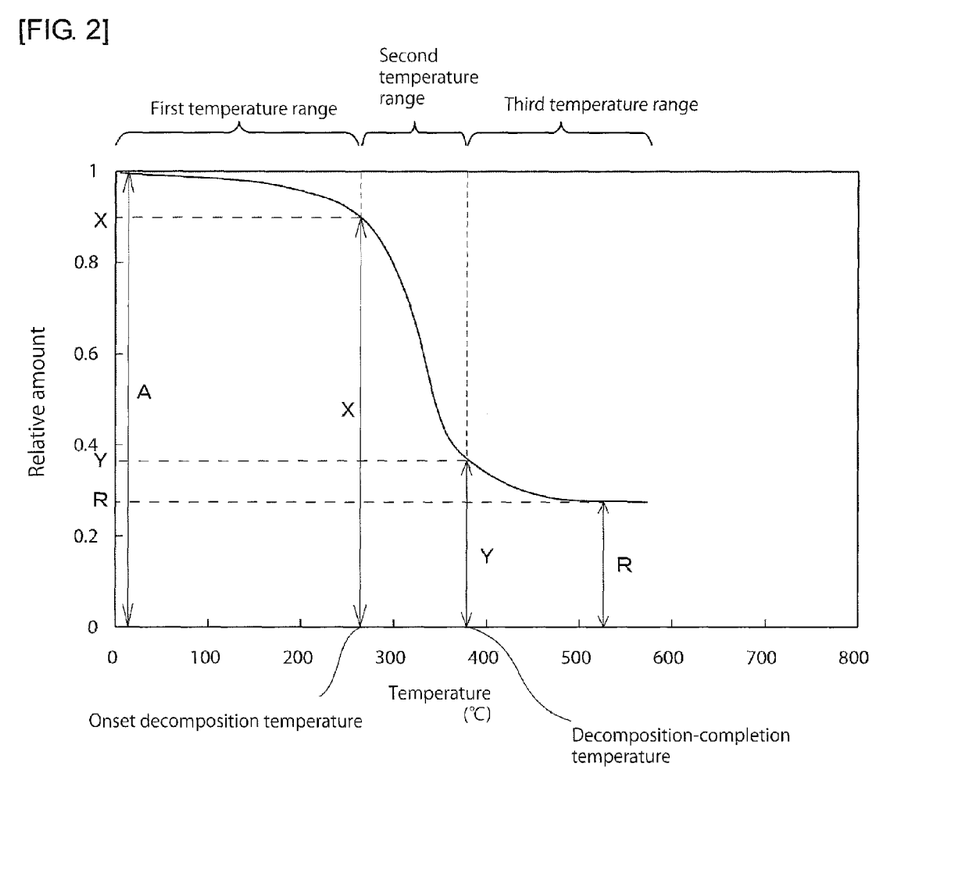
FIG. 2 is a view showing a relation between heating temperature and the relative weight concentration of a polymer when polymethylmethacrylate is used as a polymer.

As an example, a relation between heating temperature and the relative weight concentration of the polymer in a system where a residue having resistance to heat decomposition remains is shown in FIG. 2. As shown in FIG. 2, though the decomposition rate of the polymer is low in the first temperature range, the polymer is quickly decomposed to produce monomers and also to generate radicals when it is heated to the second temperature range. When the polymer is further heated to the third temperature range, it is decomposed into monomers and decomposed residue. The relative weight of the decomposed residue is defined as R. The onset decomposition temperature and the decomposition-completion temperature may be defined from the above equation by taking the weight R of the decomposed residue into consideration.

In the above equation, R becomes 0 when the polymer produces no decomposed residue even if heated to the third temperature range. Therefore, the above equation given to determine the onset decomposition temperature and the decomposition-completion temperature can be applied to a polymer generating no decomposed residue.

It is necessary that the above heating step be performed under pressure enough to prevent the monomer from being vaporized as mentioned above. Though such pressure differs depending on the volatility of monomer to be used, it is preferably 50 MPa or less in consideration of the case where styrene, alkyl(meth)acrylate or propylene mentioned above is used and also in consideration of the type of the container and amount of monomer to be stored, and desirably 10 MPa or less if the container is selected. Therefore, the above heating step can be easily performed using a pressure container currently used.

It is desirable to supply an inert gas in the above heating step in order to increase the probability of the contact of the generated radicals with exfoliated graphite. Examples of the inert gas may include nitrogen, carbon dioxide gas, argon gas, and the like. Moreover, it is desirable to supply a fluid which is put into a supercritical state by heating to the above mixture and then to perform the above heating step. This can further increase the probability of the contact of the generated radicals with exfoliated graphite. Examples of the fluid put into a supercritical state may include carbon dioxide and water which are put into a supercritical state by heating and also, have no radical trapping ability.

Moreover, a heating treatment for keeping the mixture in the second and third temperature ranges may be repeated to increase the probability of the contact of the generated radicals with exfoliated graphite.

The exfoliated graphite-polymer composite material according to the present invention is obtained by the production method of the present invention, and the X-ray diffraction peak intensity of the composite material at 26.4 degree is 50% or less of the X-ray diffraction peak intensity derived from the untreated graphite layer crystal at 26.4 degree. Specifically, according to the production method of the present invention, layers in graphite or primary exfoliated graphite are widened to be made exfoliated graphite, ensuring that an exfoliated graphite-polymer composite material in which the polymer is grafted onto exfoliated graphite can be obtained.

Advantageous Effects of Invention

According to the method for producing an exfoliated graphite-polymer composite material according to the present invention, the formation of exfoliated graphite by exfoliating to be thin and grafting of a polymer onto exfoliated graphite can be achieved at the same time only by mixing graphite or primary exfoliated graphite which is easily handled, the aforementioned depolymerizable monomer, and the polymer A or B as raw materials and by heating. Accordingly, the raw materials are very easily handled and further a carbon material-polymer composite material can be obtained only by performing temperature control, that is, without performing a long-time graft polymerization step in the heating step. Also, the process can be performed by a non-solvent process and therefore, volatile organic compounds to be discharged can be reduced.

Additionally, in the obtained composite material, various polymers which have been previously hard to be grafted can be grafted onto exfoliated graphite. Also, different kinds of polymers can be grafted and a characteristic function such as amphiphilicity can be provided to filler material consists of an exfoliated graphite-polymer composite.

DESCRIPTION OF EMBODIMENTS

Specific examples and comparative examples in the present invention will be described. However, the present invention is not limited to the following examples.

[Evaluation Method]

Examples and comparative examples to be supplemented were evaluated using any one of the following evaluation methods 1) to 5).

Evaluation Method 1): XRD Measurement

A dispersion solution containing graphite was dripped on a slide glass and dried at ambient temperature. X-ray diffraction measurement was made using an X-ray diffractometer Rint-1000 manufactured by Rigaku Corporation.

Using Cu as a target, diffraction was obtained by the $2\theta/\theta$ method in the condition of a tube voltage of 50 kV and a tube current of 150 mA. A scintillation counter was used as a detector to scan at a rate of 0.2 degree/minute.

Evaluation Method 2): TG/DTA Measurement

Graphite or exfoliated graphite (2 to 10 mg) was precisely weighed to make TG/DTA measurement by using TG/DTA 6300 manufactured by SII Nano Technology Inc.

Initial temperature was set to 25° C. and the temperature was raised to 1000° C. at a temperature rising rate of 10° C./minute.

In this case, the onset decomposition temperature and the decomposition-completion temperature were measured at a gas flow rate of 50 ml/minute through a gas passage in a nitrogen gas atmosphere.

The polymer graft rate was measured at a gas flow rate of 50 ml/minute through a gas passage in an air gas atmosphere.

In this case, a standard homopolymer was obtained and the onset decomposition temperature and the decomposition-completion temperature were measured according to the above measuring method, and the following results were obtained. However, these values are variable depending on, for example, the molecular weight of the polymer.

The definition of the ceiling temperature is described in "Radical Polymerization Handbook" p. 112 (published on Sep. 10, 2010 from NTS Inc.), and also, the ceiling temperature Tc of poly α-substituted acrylate is described in the above Handbook, p. 113. It is reported in the above Handbook that the ceiling temperature of polystyrene is 150° C. Actually, polystyrene (trade name: Styrene Polymer, manufactured by Wako Pure Chemical Industries, Ltd., degree of polymerization: 2000) was measured as above, and it was found that the onset decomposition temperature was around 350° C. and the decomposition-completion temperature was around 390° C.

The ceiling temperature of PMMA is 155.5° C. The onset decomposition temperature and decomposition-completion temperature of PMMA (trade name: PMMA, manufactured by Aldrich, MW: 350000) were measured, and it was found that the onset decomposition temperature was around 300° C. and the decomposition-completion temperature was around 350° C.

The onset decomposition temperature of polypropylene (trade name: Novatec-PP MA3H, manufactured by Japan Polypropylene Corporation) was around 350° C., and the decomposition-completion temperature thereof was around 400° C.

The onset decomposition temperature of polyethylene terephthalate (trade name: SELAR PT7001, manufactured by Du Pont) was around 360° C., and when a residue obtained when polyethylene terephthalate was heated up to 500° C. was base, the decomposition-completion temperature was around 400° C. Actually, it was estimated that when a residue obtained when polyethylene terephthalate was heated up to 1000° C. was base, the decomposition-completion temperature was around 600° C. The second temperature range in this case is defined as a range from a temperature exceeding 360° C. to 600° C. or lower.

The onset decomposition temperature and the decomposition-completion temperature were measured at a gas flow rate of 50 ml/minute in a nitrogen gas atmosphere.

A polymer graft ratio was measured at a gas flow rate of 50 ml/minute in an air gas atmosphere.

Evaluation Method 3): Measurement of Ratio of Adsorption of Polymer to Exfoliated Graphite A sample (1 to 10 g) containing a carbon material which had been subjected to high-pressure and heating reaction was dissolved in a solvent 50 times or more the weight of the sample. The resulting solution was subjected to dispersing treatment using an ultrasonic device performed at normal temperature for 30 minutes in the condition of 45 kHz and a power of 100 W.

The obtained solution was filtered using PTFE-T 300A090C, manufactured by Advantec Co., Ltd., having an average hole diameter of 3 μm with sucking by an aspirator. Moreover, a solvent having the same amount as the solution was added to filter again to thereby wash and filter the polymer unreacted with graphene.

The sample placed on filter paper was dried in an oven to remove a contained solvent.

TG/DTA measurement in the evaluation method 2) was made using the sample.

Evaluation Method 4): Method of BET Measurement

A sample of the obtained composite material for measuring specific surface area was subjected to a specific area measuring device (ASAP-2000, manufactured by SHIMADZU CORPORATION) to measure the surface area of the sample by using nitrogen gas.

Evaluation Method 5): Method of Quantitative Measurement of Degree of Exfoliating of Graphite According to the production method of the present invention, the peak derived from a layer crystal of raw material graphite at 26.4 degree decreases in size with the progress of exfoliating, that is, exfoliating to be thin in X-ray diffraction measurement. The degree of exfoliating of graphite was quantified by utilizing this principle. The quantification can be attained by adding raw material graphite before exfoliated as an internal standard sample.

Specifically, the X-ray diffraction peak value of the sample after the exfoliating treatment is expressed as SA. Raw material graphite having the same carbon weight as the weight of carbon in the sample after the exfoliating treatment is further added to the sample obtained after the exfoliating treatment to measure X-ray diffraction peak, which is expressed as SB. Peak values calibrated from the above peak values SA and SB by approximation of the base line in X-ray diffraction are expressed as SA' and SB', respectively. SB'-SA' obtained when these peak shapes are compared with each other is a peak derived from graphite added later.

Therefore, in the case where the exfoliating treatment causes no exfoliating, the peak intensity SA' of only the treated sample at 26.4 degree is one-half that of SB'. This is because the SB' peak obtained is the sum of the peak of graphite in the sample after the exfoliating treatment and the peak of graphite added later.

When graphite in the sample is perfectly exfoliated by the exfoliating treatment Contrarily, the peak of SA' becomes almost zero and the peak intensity SB' of the sample obtained by adding raw material graphite used as the internal standard sample to the sample at 26.4 degree is a peak derived from the raw material graphite added as the internal standard.

Specifically, the degree of exfoliating of graphite in the exfoliating treatment can be quantified by comparing the X-ray diffraction peak of the sample after the exfoliating treatment with the X-ray diffraction peak of the sample obtained after adding raw material graphite as the internal standard sample to the former sample.

COMPARATIVE EXAMPLE 1

XRD Analysis of Raw Material Graphite Sheet

A product (Stock Number: PF100-UHP, manufactured by TOYO TANSO CO., LTD.) was prepared as the raw material graphite sheet.

Into a glass sample bottle were charged 10 mg of the sheet and 20 ml of MEK to perform ultrasonic treatment. An ultrasonic treatment device, W-113 SAMPA, manufactured by Honda Electronics Co., Ltd., was used to carry out ultrasonic treatment for 30 minutes in the condition of a power of 100 W and an oscillating frequency of 28 kHz. A coarse dispersion solution was obtained in which particles can be seen from the outside as appearance. XRD measurement of the dispersion solution was made according to the previous evaluation method 1).

Figure 3:
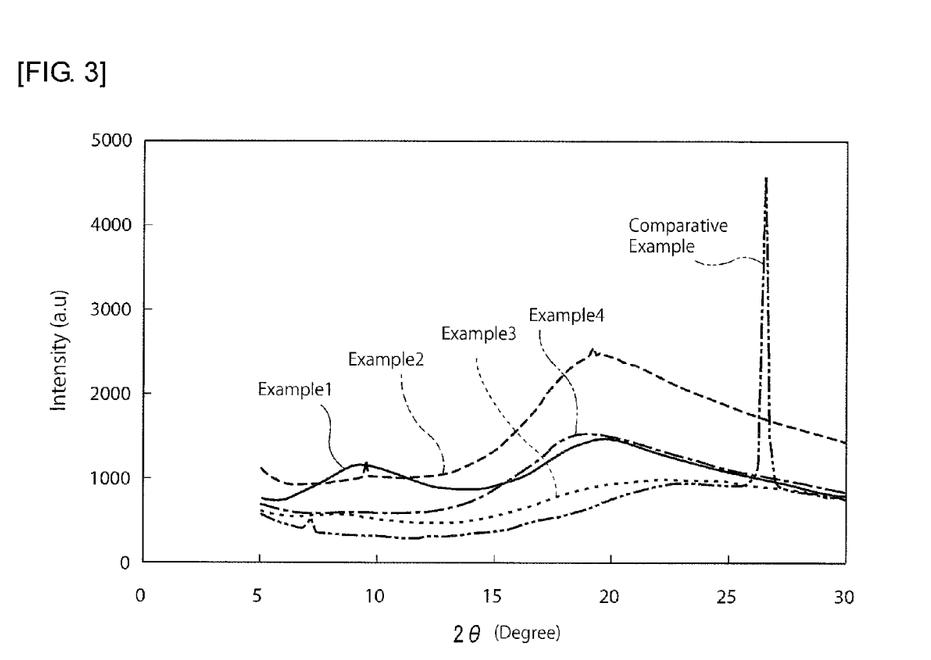
FIG. 3 is a view showing the XRD spectra of graphite or exfoliated graphite obtained in Comparative Example and Examples 1 to 4.

The obtained results are shown in FIG. 3. The peak derived from a graphite layer crystal was observed at an angle close to 26.4 degree.

EXAMPLE 1

As the raw material sheet, a product (Stock Number: PF100-UHP, manufactured by TOYO TANSO CO., LTD.) was prepared.

The graphite sheet (38.9 mg) was charged into a pipe having an internal volume of 5 ml and a structure in which both ends of the pipe can be fastened with a bolt. Further, 2 g of a styrene monomer was charged into the pipe and then, both ends of the pipe were fastened with a bolt. Then, the pipe was poured into a sand bath set to a temperature of 250° C. and allowed to stand for 37 minutes.

The obtained pipe was poured into cool water to cool. When the bolt was released to open the pipe after cooling, a hard and transparent resin block was obtained.

This resin block was dipped in MEK to dissolve. The ultrasonic treatment was performed for 30 minutes to make a coarse dispersion solution. Though the original graphite sheet block was left in the form of sediment, the dispersion phase, that is, a black supernatant was taken out and filtered using PTFE-T300A090C, manufactured by Advantec Co., Ltd., having a hole diameter of 3 μm with sucking by an aspirator. The filtered residue was redispersed in MEK to prepare a solution for XRD measurement.

The obtained results are shown in FIG. 3. In the case of a material moved to the dispersion phase, it was observed that the peak derived from the graphite layer disappeared and a two-peak pattern was obtained at 10 degree and 20 degree.

EXAMPLE 2

A sample pipe was prepared in the same manner as in Example 1 except that the amount of the graphite sheet sample was changed to 40.6 mg and the amount of the styrene monomer was changed to 1.6 g. The sample pipe was poured into a sand bath set to a temperature of 350° C. and allowed to stand for 45 minutes.

The obtained pipe was poured into cool water to cool. When the bolt was released to open the pipe after cooling, a viscous liquid resin was obtained.

This resin block was dipped in MEK to dissolve. The ultrasonic treatment was performed for 30 minutes to make a coarse dispersion solution. Though the original graphite sheet block was slightly left, the black dispersant was taken out and filtered using PTFE-T300A090C, manufactured by Advantec Co., Ltd., having a hole diameter of 3 μm with sucking by an aspirator. The filtered residue was redispersed in MEK to prepare a solution for XRD measurement. The obtained results are shown in FIG. 3. In the case of a material moved to the dispersion phase, it was observed that the peak derived from the graphite layer disappeared and a single peak pattern was obtained at around 20 degree.

EXAMPLE 3

A sample pipe was prepared in the same manner as in Example 1 except that the amount of the graphite sheet sample was changed to 38.5 mg, the amount of the styrene monomer was changed to 1 g, and 0.6 g of normal decane was used. The sample pipe was poured into a sand bath set to a temperature of 350° C. and allowed to stand for 40 minutes.

The obtained pipe was poured into cool water to cool. When the bolt was released to open the pipe after cooling, a viscous liquid resin was obtained.

This resin block was dipped in MEK to dissolve. The ultrasonic treatment was performed for 30 minutes to make a coarse dispersion solution. Though the original graphite sheet block was left, the supernatant yellow dispersant was taken out and filtered using PTFE-T300A090C, manufactured by Advantec Co., Ltd., having a hole diameter of 3 μm with sucking by an aspirator. The filtered residue was redispersed in MEK to prepare a solution for XRD measurement. The obtained results are shown in FIG. 3. In the case of a material moved to the dispersion phase, it was observed that the peak derived from the graphite layer disappeared and a peak at around 10 degree and 20 degree also disappeared.

EXAMPLE 4

A sample pipe was prepared in the same manner as in Example 1 except that the amount of the graphite sheet sample was changed to 44.7 mg and the amount of the styrene monomer was changed to 1.35 g. The sample pipe was poured into a sand bath set to a temperature of 375° C. and allowed to stand for 120 minutes.

The obtained pipe was poured into cool water to cool. When the bolt was released to open the pipe after cooling, a black viscous liquid resin was obtained.

This resin block was dipped in MEK to dissolve. The ultrasonic treatment was performed for 30 minutes to make a coarse dispersion solution. The original graphite sheet block disappeared. This black dispersant was taken out and the whole dispersant was filtered using PTFE-T300A090C, manufactured by Advantec Co., Ltd., having a hole diameter of 3 μm with sucking by an aspirator. The filtered residue was redispersed in MEK to prepare a solution for XRD measurement. The obtained results are shown in FIG. 3. In the case of a material moved to the dispersion phase, it was observed that the peak derived from the graphite layer disappeared and a single peak pattern was obtained at around 20 degree.

EXAMPLE 5

Preparation of Partially Exfoliated Graphene

A low-density graphite sheet (Stock Number: PF100-UHO) manufactured by TOYO TANSO CO., LTD.) having a density of 0.7 and a thickness of 1 mm by using a graphite sheet as a raw material was prepared. The above sheet graphite was cut into a size of 3 cm×3 cm to obtain sheet graphite as an electrode material. On this sheet graphite, a slit was formed by cutting using a knife such that it had a length of 1 cm and a width of 1 cm. An electrode made of Pt was inserted into the sheet graphite on which two slits were formed. The sheet graphite prepared in this manner was used as a working electrode (cathode) and was dipped together with a counter electrode (anode) made of Pt, and a reference electrode made of Ag/AgCl in an aqueous 60 wt % nitric acid solution, and a DC voltage was applied to perform electrochemical treatment.

In the electrochemical treatment, a current value was fixed at 0.7 A and a current was applied for 2 hours. Graphite used as the working electrode for the cathode in this manner was gradually expanded so that the thickness was increased several times.

The expanded graphite obtained in this manner was dried to evaluate the multilayer structure of the expanded graphite by XRD measurement. The XRD pattern of the expanded graphite is shown by the solid line in FIG. 4.

Figure 4:
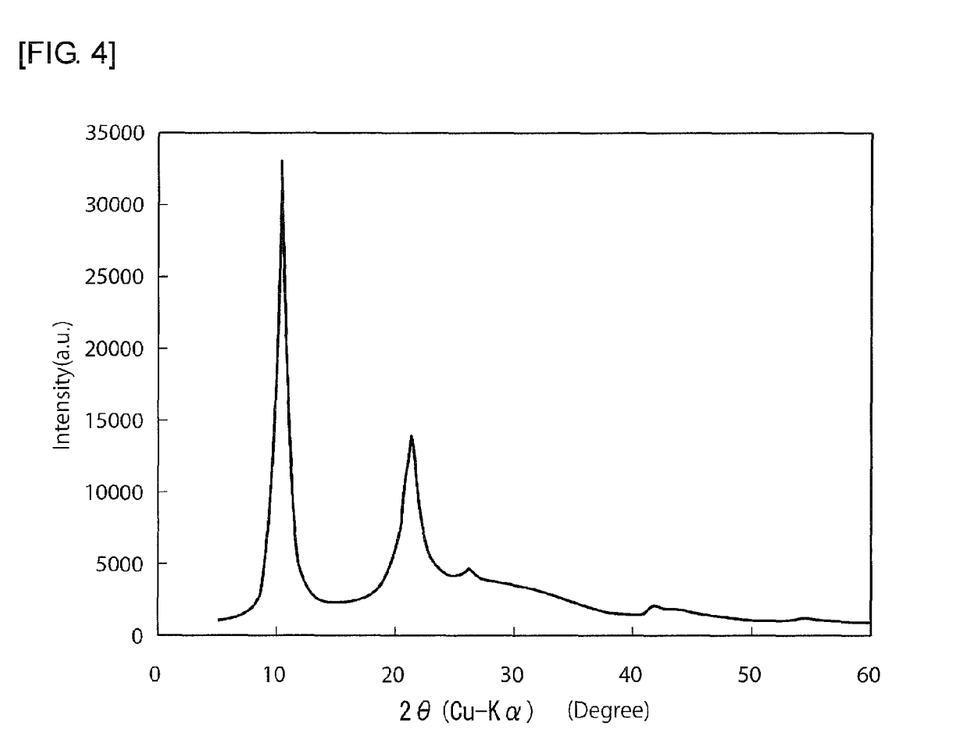
FIG. 4 is a view showing the XRD spectrum of expanded graphite obtained in Example 4.
Figure 5:
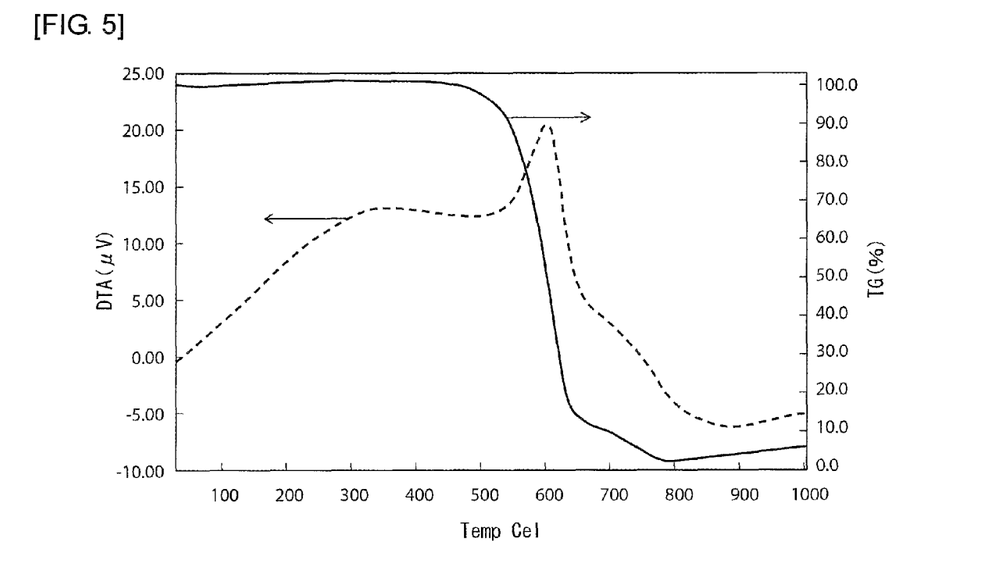
FIG. 5 is a view showing the results of TG/DTA measurement of a carbonaceous material obtained in Example 5.

A graphite multilayer structure is slightly observed.

The expanded graphite obtained above was cut into 1-cm square forms and one of these square graphite was put into a cUarbon crucible to perform electromagnetic induction heat treatment. For this treatment, an induction heating device, M1700D, manufactured by SK medical Electronics Co., Ltd., was used to carry out treatment at a current of 10 A in an argon gas atmosphere such that the maximum temperature reached 550° C. The expanded graphite was exfoliated to be thin by the electromagnetic induction heating. When the obtained cotton-like exfoliated graphite was measured by a specific surface area measuring device, ASAP-2000, manufactured by SHIMADZU CORPORA- TION, using nitrogen gas, it had a specific surface area of 674 m²/g by one measurement.

The obtained carbonaceous material was subjected to TG/DTA measurement. The results are shown in Table 5.

EXAMPLE 6

A sample pipe was prepared in the same manner as in Example 1 except that 50.3 mg of the cotton-like exfoliated graphene obtained in Example 5 and the 2 g of styrene monomer was used, though the amount of styrene monomer was changed in the case of example 1. The sample pipe was poured into a sand bath set to a temperature of 340° C. and allowed to stand for 120 minutes.

The obtained pipe was poured into cool water to cool. When the bolt was released to open the pipe after cooling, a hard and solid resin block was obtained.

This resin block was dipped in toluene to dissolve. The ultrasonic treatment was performed for 30 minutes to make a coarse dispersion solution. The black dispersant was taken out and filtered using PTFE-T300A090C, manufactured by Advantec Co., Ltd., having a hole diameter of 3 μm with sucking by an aspirator. The filtered residue was redispersed in 50 ml of toluene and refiltered to wash unreacted polystyrene left in the residue. The residue was heated at 120° C. in an oven to vaporize a remaining solvent to dryness. The obtained carbonaceous material was subjected to TG/DTA measurement. The results are shown in FIG. 6.

Figure 6:
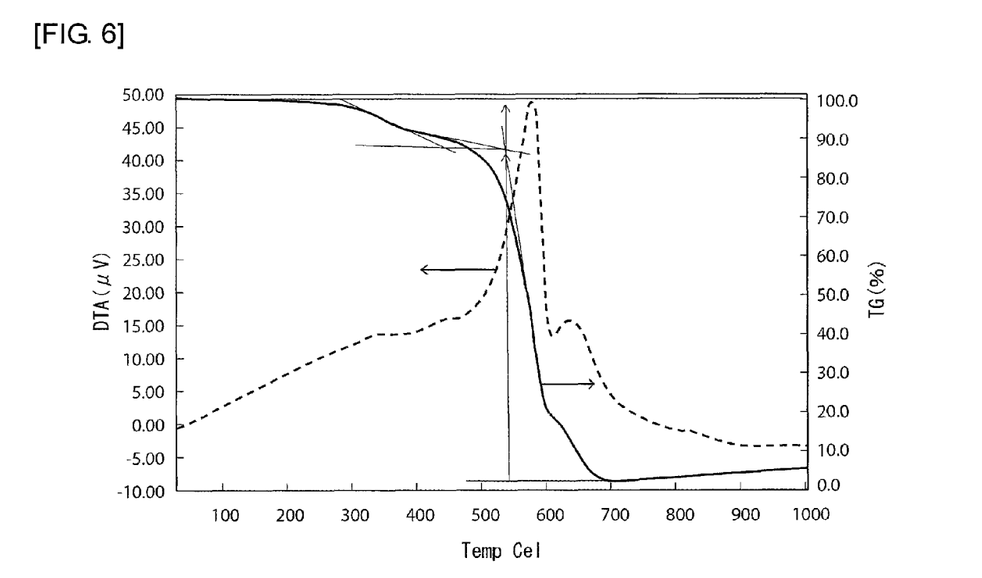
FIG. 6 is a view showing the results of TG/DTA measurement of a carbonaceous material obtained in Example 6.

As is clear from FIG. 6, the peak derived from exfoliated carbon was 85.5%, among which the part to be chars was 2.6% and the part derived from graft polystyrene was 14.5%.

EXAMPLE 7

A sample pipe was prepared in the same manner as in Example 1 except that 43.9 mg of the cotton-like exfoliated graphene obtained in Example 5 and 2.0 g of a PMMA polymer having a molecular weight of 15000 were used. The sample pipe was poured into a sand bath set to a temperature of 340° C. and allowed to stand for 135 minutes.

The obtained pipe was poured into cool water to cool. When the bolt was released to open the pipe after cooling, a viscous and black resin block was obtained.

This resin block was dipped in THF (tetrahydrofuran) to dissolve. The ultrasonic treatment was performed for 30 minutes to make a coarse dispersion solution. The black dispersant was taken out and the whole thereof was filtered using PTFE-T300A090C, manufactured by Advantec Co., Ltd., having a hole diameter of 3 μm with sucking by an aspirator. The filtered residue was redispersed in 50 ml of THF and refiltered to wash unreacted PMMA left in the residue. The residue was heated at 100° C. in an oven to vaporize a remaining solvent to dryness. The obtained carbonaceous material was subjected to TG/DTA measurement. The results are shown in FIG. 7.

Figure 7:
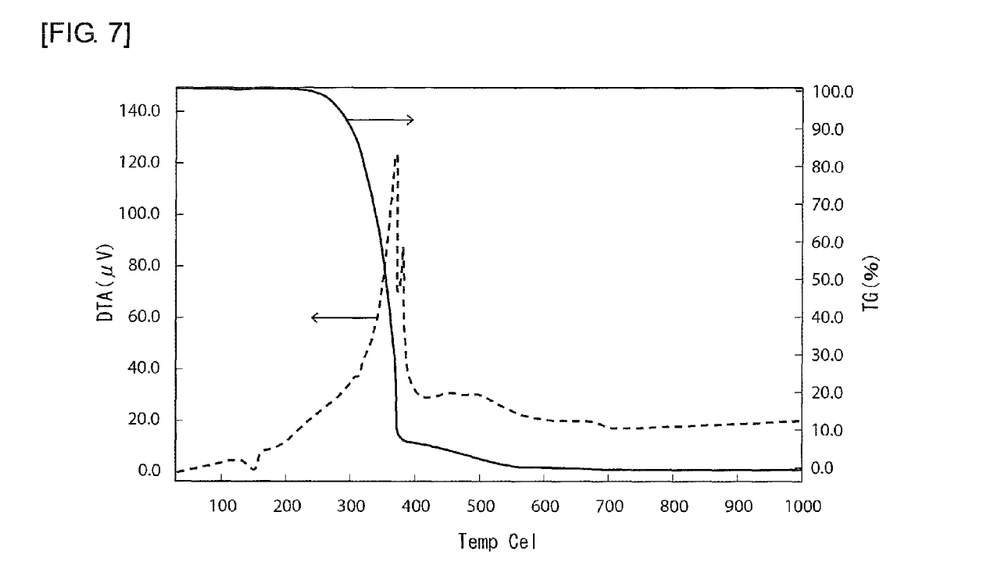
FIG. 7 is a view showing the results of TG/DTA measurement of a carbonaceous material obtained in Example 7.

As is clear from FIG. 7, the peak derived from exfoliated carbon was 11.0%, among which the part to be chars was 0.3% and the part derived from graft PMMA was 89%.

EXAMPLE 8

A sample pipe was prepared in the same manner as in Example 5 except that 49.1 mg of the cotton-like exfoliated graphene obtained in Example 5, 2.56 g of a polypropylene resin (Novatec PP MA3H, manufactured by Japan Polypropylene Corporation), and a reaction pipe having an internal volume of 7.4 ml were used. The sample pipe was poured into a sand bath set to a temperature of 370° C. and allowed to stand for 210 minutes.

The obtained pipe was poured into cool water to cool until its external temperature dropped to about 250° C.

When the bolt was released to open the pipe in a high-temperature state, a viscous and black resin block was obtained.

This resin block was dipped in heated xylene to dissolve. The ultrasonic treatment was performed for 30 minutes to make a coarse dispersion solution. The black dispersant was taken out and the whole thereof was filtered using PTFE-T300A090C, manufactured by Advantec Co., Ltd., having a hole diameter of 3 μm with sucking by an aspirator. The filtered residue was redispersed in 50 ml of heated xylene and refiltered to wash unreacted PP left in the residue. The residue was heated at 150° C. in an oven to vaporize a remaining solvent to dryness. The obtained carbonaceous material was subjected to TG/DTA measurement. The results are shown in FIG. 8.

Figure 8:
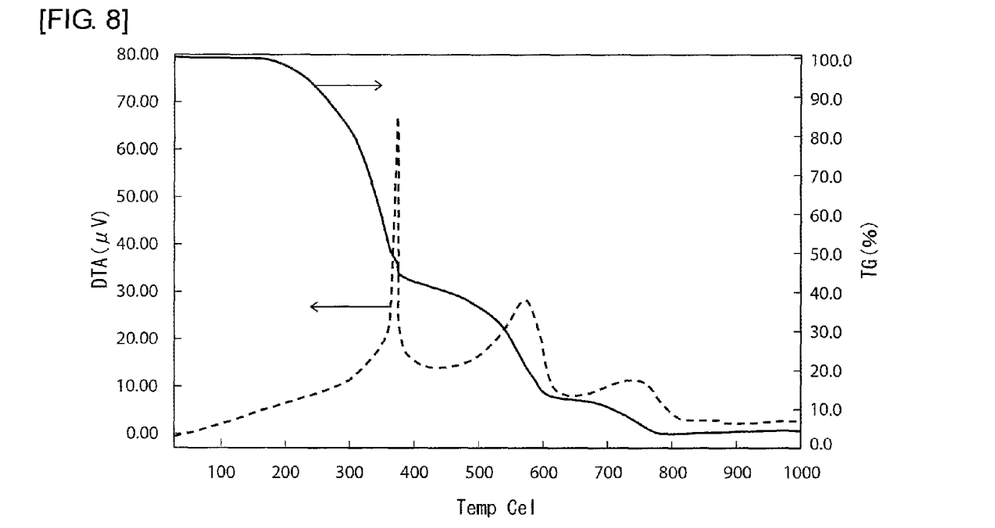
FIG. 8 is a view showing the results of TG/DTA measurement of a carbonaceous material obtained in Example 8.

As is clear from FIG. 8, the peak derived from exfoliated carbon was 51.2%, among which the part to be chars was 3.6% and the part derived from graft PP was 48.8%.

EXAMPLE 9

As the raw material graphite sheet, a product (Stock Number: PF100-UHP, manufactured by TOYO TANSO CO., LTD.) was prepared.

The graphite sheet (100 mg) was charged into a pipe having an internal volume of 10 ml and a structure in which both ends thereof can be fastened with a bolt. A pressure gauge and an introduction cock for introducing carbon dioxide gas were installed on one end of the pipe. Moreover, 4 g of a styrene monomer was charged into the pipe and both ends of the pipe were each fastened with a bolt. Using a carbon dioxide gas injection device, carbon dioxide gas was introduced until the internal pressure reached 8 MPa.

The pipe sample was gradually heated by a mantle heater while detecting the surface temperature thereof.

The internal pressure was 13.5 MPa when the surface temperature was 80° C., 16 MPa when the surface temperature was 100° C., 21 MPa when the surface temperature was 150° C., and 23 MPa when the surface temperature was 175° C. The pressure was 26.5 MPa when the pipe sample was heated up to 200° C., and the temperature was kept for 20 minutes as it was.

The obtained pipe was poured into cool water to cool. When the bolt was released to open the pipe after cooling, a black and viscous resin block was obtained.

This resin block was dipped in tetrahydrofuran to dissolve. The ultrasonic treatment was performed for 30 minutes to make a coarse dispersion solution. Though the original graphite sheet block was left in the form of sediment, a black supernatant was taken out and filtered using PTFE-T300A090C, manufactured by Advantec Co., Ltd., having a hole diameter of 3 μm with sucking by an aspirator. The filtered residue was redispersed in THF to prepare a solution for XRD measurement.

Figure 9:
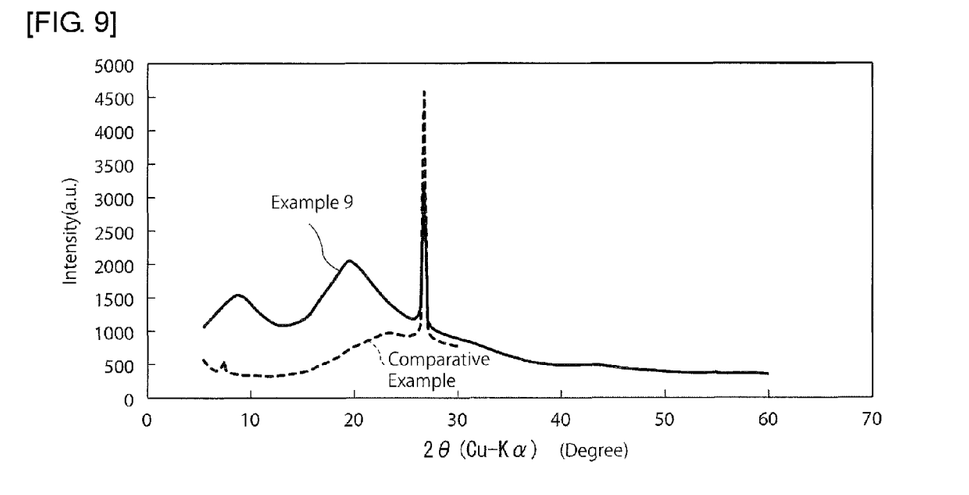
FIG. 9 is a view showing the XRD spectrum of a carbonaceous material obtained in Example 9.

XRD of the obtained sample is shown in FIG. 9. Though low-temperature and short-time treatment (200° C. and 20 minutes) was performed, a peak derived from a graphite layer structure at 26.4 degree was reduced and a broad two-peak pattern was observed on the low-angle side. This suggests that a layer interval between graphite layers is so widened that the graphite layer structure is changed to various crystal structures differing in void interval. The degree of exfoliating was almost about 50%.

The invention claimed is:

1. A method for producing an exfoliated graphite-polymer composite material, the method comprising:
   a step of mixing graphite or primary exfoliated graphite with a depolymerizable monomer of which the polymer is decomposed by heating to generate radicals and also to form a monomer or an oligomer, or a polymer A of the monomer, or a polymer B which generates radicals at a temperature equal to or higher than its onset decomposition temperature to obtain a mixture;
   a heating step of putting said mixture in a non-open container to heat said mixture to a first temperature range or to a temperature higher than the first temperature range when a temperature range from a ceiling temperature of said polymer A or B or higher to an onset decomposition temperature or lower of said polymer A or B defined as the first temperature range, and heating the mixture to a second temperature range exceeding the onset decomposition temperature but not exceeding a decomposition-completion temperature when a temperature at which 10% by weight of said polymer A or B is decomposed is defined as the onset decomposition temperature and a temperature at which 90% by weight of said polymer A or B is decomposed is defined as the decomposition-completion temperature, and
   a step of repeating a step of heating the mixture to said first temperature range and a step of heating the mixture to said second temperature range.

2. A method for producing an exfoliated graphite-polymer composite material, the method comprising:
   a step of mixing graphite or primary exfoliated graphite with a depolymerizable monomer of which the polymer is decomposed by heating to generate radicals and also to form a monomer or an oligomer, or a polymer A of the monomer, or a polymer B which generates radicals at a temperature equal to or higher than its onset decomposition temperature to obtain a mixture;
   a heating step of putting said mixture in a non-open container to heat said mixture to a first temperature range or to a temperature higher than the first temperature range when a temperature range from a ceiling temperature of said polymer A or B or higher to an onset decomposition temperature or lower of said polymer A or B is defined as the first temperature range, and heating the mixture to a second temperature range exceeding the onset decomposition temperature but not exceeding a &composition-completion temperature when a temperature at which 10% by weight of said polymer A or B is decomposed is defined as the onset decomposition temperature and a temperature at which 90% by weight of said polymer A or B is decomposed is defined as the decomposition-completion temperature; and
   a heating step of heating the mixture to a third temperature range higher than the decomposition-completion temperature,
   wherein the heating step of heating die mixture to said second temperature range and the heating step of heating the mixture to said third temperature range are repeated.

3. The method for producing an exfoliated graphite-polymer composite material according to claim 1, wherein the onset decomposition temperature is a temperature at which the equation, $(X-R)/(A_0-R)=0.9$, is satisfied, and the decomposition-completion temperature is a temperature at which the equation, $(Y-R)/(A_0-R)=0.1$, is satisfied, when the weight of a decomposed residue at a temperature higher than the decomposition-completion temperature of said polymer A or B and at a temperature of 1000° C. or lower is R, the maximum weight of the polymer A or B in the first temperature range is $A_0$, the weight of the polymer A or B at the onset decomposition temperature is X, and the weight of the polymer A or B at the decomposition-completion temperature is Y.

4. The method for producing an exfoliated graphite-polymer composite material according to claim 1, wherein two or more types of monomers or polymers are used as said monomer or polymer A or B.

5. A method for producing an exfoliated graphite-polymer composite material, the method comprising:
   a step consisting of mixing graphite or primary exfoliated graphite with a depolymerizable monomer of which the polymer is decomposed by heating to generate radicals and also to form a monomer or an oligomer, or a polymer A of the monomer, or a polymer B which generates radicals at a temperature equal to or higher than its onset decomposition temperature to obtain a mixture;
   a step consisting of putting said mixture into a container and closing the container with only the mixture therein; and
   a heating step of heating said mixture in the closed container to a first temperature range or to a temperature higher than the first temperature range to obtain exfoliated graphite by delamination of the graphite or primary exfoliated graphite and graft the polymer A or polymer B to the exfoliated graphite when a temperature range from a ceiling temperature of said polymer A or B or higher to an onset decomposition temperature or lower of said polymer A or B is defined as the first temperature range.

6. The method for producing an exfoliated graphite-polymer composite material according to claim 1, wherein said mixture does not contain a polymerization initiator.

7. An exfoliated graphite-polymer composite material obtained by the method for producing an exfoliated graphite-polymer composite material as claimed in claim 1, the composite material having an X-ray diffraction peak intensity of 50% or less of the X-ray diffraction peak intensity derived from the untreated graphite layer crystal at 26.4 degree.

8. The method for producing an exfoliated graphite-polymer composite material according to claim 2, wherein the onset decomposition temperature is a temperature at which the equation, $(X-R)/(A_0-R)=0.9$, is satisfied, and the decomposition-completion temperature is a temperature at which the equation, $(Y-R)/(A_0-R)=0.1$, is satisfied, when the weight of a decomposed residue at a temperature higher than the decomposition-completion temperature of said polymer A or B and at a temperature of 1000° C. or lower is R, the maximum weight of the polymer A or B in the first temperature range is $A_0$, the weight of the polymer A or B at the onset decomposition temperature is X, and the weight of the polymer A or B at the decomposition-completion temperature is Y.

9. The method for producing an exfoliated graphite-polymer composite material according to claim 2, wherein two or more types of monomers or polymers are used as said monomer or polymer A or B.

10. The method for producing an exfoliated graphite-polymer composite material according to claim 2, wherein said mixture does not contain a polymerization initiator.

* * * * *